(12) United States Patent
Brownstein et al.

(10) Patent No.: US 11,753,941 B2
(45) Date of Patent: Sep. 12, 2023

(54) SEPARABLE FLUID TURBINE ROTOR

(71) Applicant: XFlow Energy Company, Seattle, WA (US)

(72) Inventors: Ian D. Brownstein, Seattle, WA (US); Benjamin W. Strom, Seattle, WA (US)

(73) Assignee: XFlow Energy Company, Seattle, WA (US)

( * ) Notice: Subject to any disclaimer, the term of this patent is extended or adjusted under 35 U.S.C. 154(b) by 0 days.

(21) Appl. No.: 17/246,043

(22) Filed: Apr. 30, 2021

(65) Prior Publication Data

US 2021/0348511 A1 Nov. 11, 2021

Related U.S. Application Data

(60) Provisional application No. 63/023,151, filed on May 11, 2020.

(51) Int. Cl.
*F03D 3/06* (2006.01)
*F01D 5/14* (2006.01)

(52) U.S. Cl.
CPC ............ *F03D 3/065* (2013.01); *F01D 5/147* (2013.01); *F03D 3/062* (2013.01); *F03D 3/064* (2013.01); *F05B 2240/30* (2013.01); *F05D 2240/30* (2013.01)

(58) Field of Classification Search
CPC .......... F03D 3/065; F03D 3/061; F03D 3/062; F03D 3/064; F01D 5/147; F01D 1/18; F05B 2240/30; F05B 2220/30; F05B 2240/211; F05B 2210/16; F05B 2240/214; F05B 2240/302; F05D 2240/30; F05D 2240/24; Y02E 10/72; Y02E 10/74
See application file for complete search history.

(56) References Cited

U.S. PATENT DOCUMENTS

| | | | | | |
|---|---|---|---|---|---|
| 4,130,380 | A | * | 12/1978 | Kaiser | F03D 3/065 |
| | | | | | 416/197 A |
| 5,518,367 | A | * | 5/1996 | Verastegui | F03D 3/061 |
| | | | | | 416/131 |
| 5,531,567 | A | * | 7/1996 | Hulls | F03D 3/064 |
| | | | | | 416/DIG. 8 |
| 9,284,944 | B2 | * | 3/2016 | Yoon | F03D 3/061 |
| 2010/0278653 | A1 | * | 11/2010 | Sassow | F03D 3/061 |
| | | | | | 416/223 R |
| 2013/0136612 | A1 | * | 5/2013 | Tull de Salis | F03D 3/005 |
| | | | | | 416/223 R |
| 2013/0156585 | A1 | * | 6/2013 | Mangano | F03D 3/061 |
| | | | | | 416/210 R |
| 2013/0183164 | A1 | * | 7/2013 | Silvert | F03D 3/064 |
| | | | | | 416/244 R |
| 2020/0132047 | A1 | * | 4/2020 | Saeed | F03D 9/25 |

* cited by examiner

*Primary Examiner* — Aaron R Eastman
(74) *Attorney, Agent, or Firm* — Dorsey & Whitney LLP (57) ABSTRACT

A separable fluid turbine rotor turbine is described herein. The fluid turbine includes blades and support arms to adjoin the blades to a hub. The blades, support arms, or blades and supports can be assembled from a plurality of segments which are adjoined via one or more connectors. The connectors can be internal or external to the blade or support arm segments. Additional connectors can be used to adjoin the blades and support arms, the blades and the hub, and the support arms and the hub.

12 Claims, 11 Drawing Sheets

SEPARABLE FLUID TURBINE ROTOR

CROSS-REFERENCE TO RELATED APPLICATION

This application claims the benefit of U.S. Provisional Application 63/023,151, filed May 11, 2020, the contents of which are herein incorporated by reference in their entirety.

BACKGROUND

Renewable energy is energy that is collected from renewable sources, including wind, solar, hydropower, geothermal, and biomass. In the United States, renewable energy is the fastest-growing energy source, increasing approximately 100 percent from 2000 to 2018. In 2018, renewable energy within the United States accounted for approximately 17.1 percent of electricity generation. Electricity generation is anticipated to increase to 24 percent by 2030 with most of the increase expected to come from wind and solar. Consumption of renewables within the United States over the next 30 years is projected to grow at an average annual rate of 1.8 percent. In 2018, in the United States, wind power accounted for approximately 6.6 percent of net electricity generation.

On a global scale, renewables accounted for approximately 26.2 percent of electricity generation in 2018. By 2040, that is projected to increase to 45 percent, with a majority of the increase coming from solar, wind, and hydropower. After hydropower, wind provided the second most power generation—producing more than 5 percent of global electricity in 2018 with 591 gigawatts (GWs) of global capacity.

As renewables, such as wind, increase in usage, operations and maintenance of the equipment generating the electricity from the renewables will increase. For example, operations and maintenance cost can range from $42,000 to $48,000/megawatt during the 10 years of a wind turbine's operation.

What is needed is a fluid turbine allowing for more efficient installation, maintenance, transportation, disassembly, or the like. What is needed is a fluid turbine allowing for reduced maintenance, reduced cost, or both.

DETAILED DESCRIPTION

A fluid turbine can convert fluid energy into another form of energy, such as electricity, or can be used to generate work or force to be applied to another device or to provide an additional function, such as pumping water.

In one example, the fluid, such as air or water, turns a rotor, which is connected directly to a gearbox. The gearbox converts a lower speed rotation of the drive shaft into a higher speed rotation to drive the generator. The generator converts the kinetic energy of the rotation into electrical energy.

In another example, the fluid turns a rotor, which is connected to a permanent magnet generator to generate electricity. No gearbox is used. A drive shaft can be included, where it is desirous to do so.

In yet another example, the fluid turns a rotor, which spins a generator via a drive shaft, thereby creating electricity. More specifically, the kinetic energy of the moving air causes a rotor, having one or more blades, to rotate a drive shaft. The drive shaft is connected to a generator via a gearbox, where it is desirous to do so.

To make transportation, assembly, maintenance, or the like easier or more efficiently, the blades of the fluid turbine can be formed from a plurality of pieces. For example, the blades can be formed by a plurality of blade pieces adjoined or connected by connectors. The connectors can also be adjoined or connected to support arms to adjoin or connect the blade to a hub.

For ease of convenience, the example fluid turbine is discussed herein as a vertical axis wind turbine. However, the fluid turbine is not intended to be so limited. The fluid turbine can be driven by any fluid, including air (e.g., wind) or a liquid (e.g., water). The fluid turbine can also have any orientation or axis orientation, including vertical or horizontal such that the axis of rotation is perpendicular or parallel to incoming fluid flow (e.g., free-stream velocity vector). Most generally, a fluid turbine with its axis of rotation perpendicular to the incoming fluid flow is referred to as a cross flow fluid turbine and a fluid turbine with its axis of rotation parallel to the incoming fluid flow is referred to as an axial fluid turbine. The fluid turbine can be a cross flow or axial flow turbine.

Figure 1A:
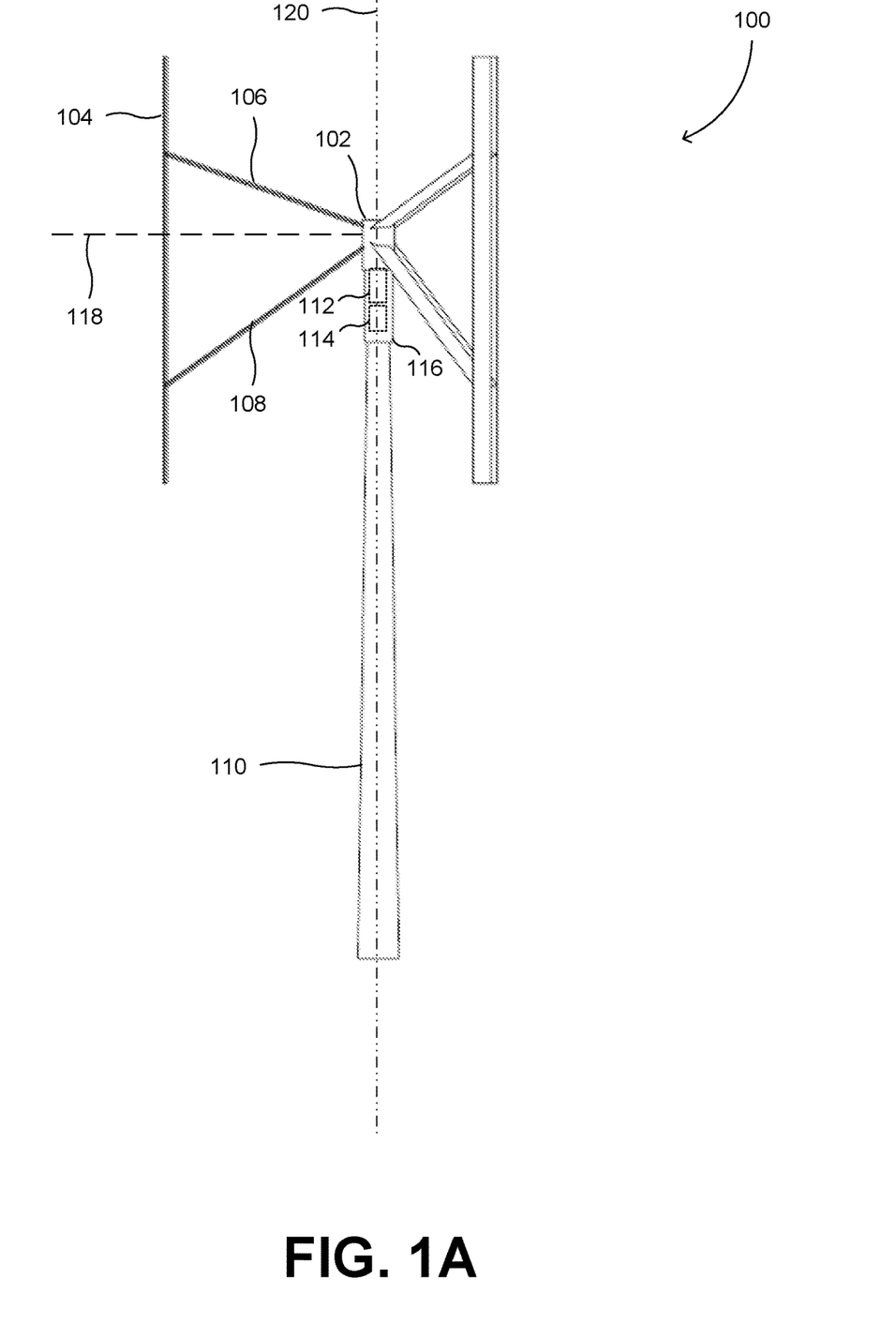
FIGS. 1A-1B illustrates an example wind turbine.
Figure 1B:
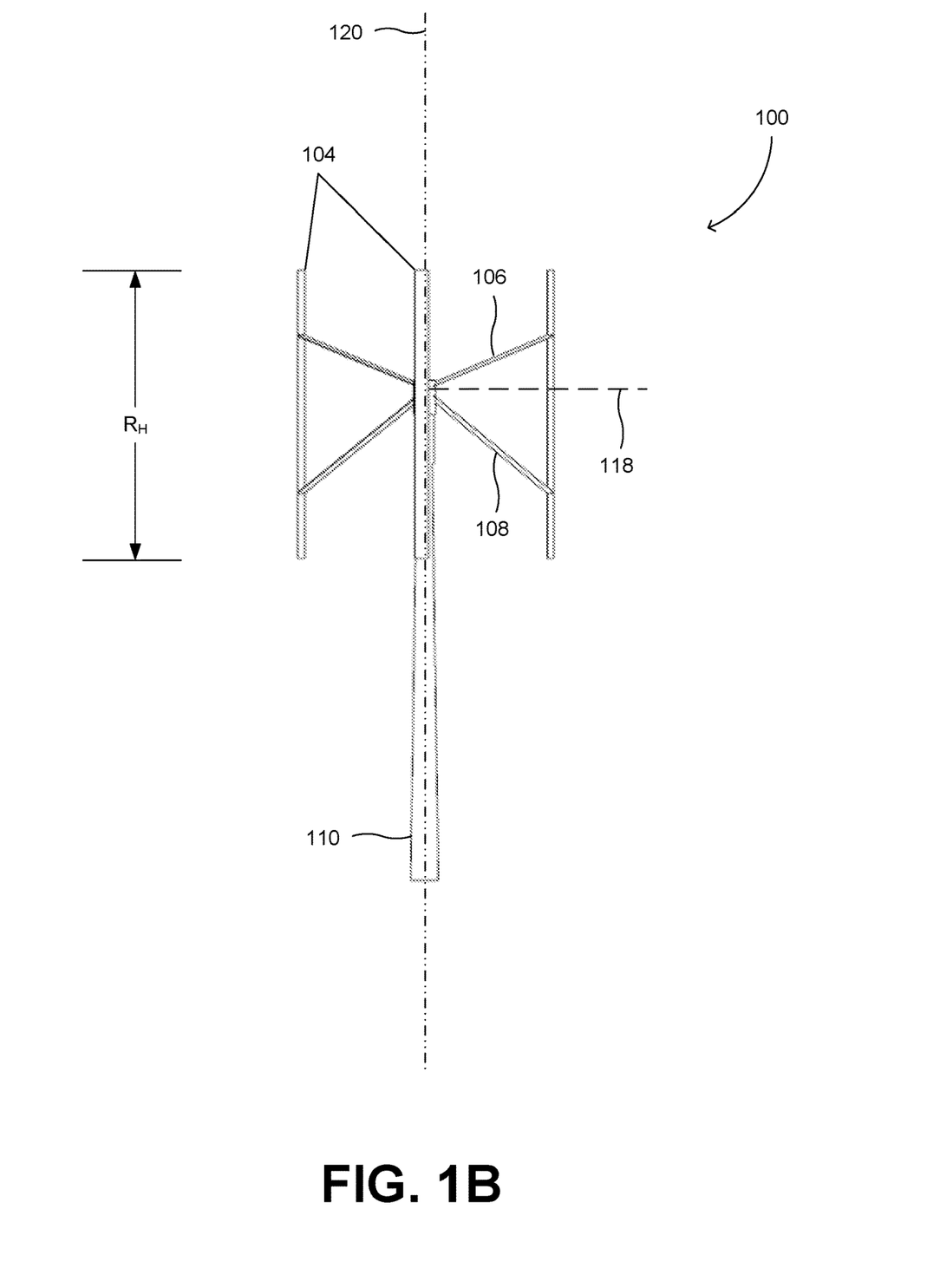
Figure 1C:
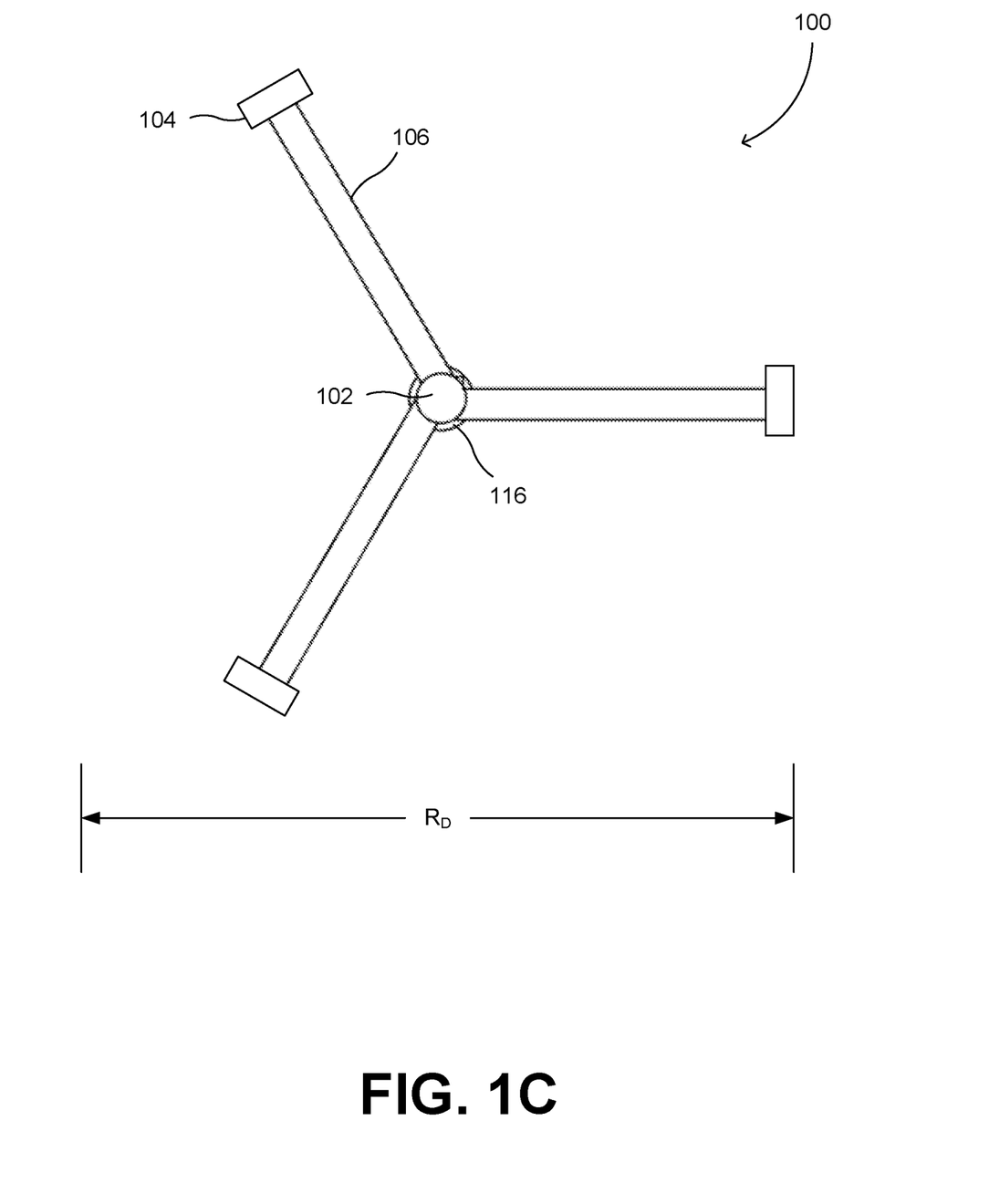
FIG. 1C illustrates a top down view of the example wind turbine.

FIGS. 1A-1C shows a vertical axis wind turbine (VAWT) 100. The VAWT 100 includes a rotor connected to a gearbox 112. The rotor includes blades 104 connected to a hub 102. The hub 102 is adjoined to the gearbox 112. Each blade 104 is connected to the hub 102. Each blade 104 can be connected to the hub 102 via one or more support arms. For discussion purposes, each blade 104 is connected to the hub 102 via a first support arm 106 and a second support arm 108. However, this disclosure is not intended to be so limited. Each blade 104 can be connected to the hub 102 via a single support arm, two support arms, three support arms, or more. A rotor segment includes the two support arms 106, 108, and the blade 104 adjoined or connected to the hub via the two support arms 106, 108.

The rotor collects the energy present in the wind and transforms this energy into mechanical motion. The amount of energy the rotor can extract from the wind is proportional to the swept area of the rotor, which can include a rotor diameter RD, a rotor height RH, or both. For example, as the rotor diameter RD increases, the amount of energy the rotor extracts from the wind increases. As another example, as the rotor height RH increases, the amount of energy the rotor extracts from the wind increases. The blades 104 convert the kinetic energy of the wind into the rotation of the hub 102.

The first and second support arms 106, 108 can extend from the hub 102 at any appropriate angle relative to a horizontal axis 118.

The gearbox 112 converts a lower speed rotation of the rotor into a higher speed rotation to drive the generator 114. The types of gearboxes can include planetary, helical, parallel shaft, spur, worm, the like, or combinations or multiples thereof. The types of generators can include permanent magnet, induction, reluctance, the like, or combinations or multiples thereof. The generator 114 may also be classified as a motor, but operate in reverse to serve the function of a generator. The generator 114 converts the kinetic energy of the rotation into electrical energy.

The VAWT 100 can also include a housing 116. The housing 116 can cover, enclose, or protect one or more components of the VAWT 100, including the gearbox 114, the generator 116, or both.

The VAWT 100 can also include a tower 110 to support the weight of the blades 104, the generator 114, the gearbox 112, and any other component. The tower 110 can also resist the side-force of the wind.

The VAWT 100 and the components thereof can be composed of a metal (e.g., aluminum or steel), fiberglass, carbon fiber, a polymer, the like, or combinations or multiples thereof. The VAWT 100 and the components thereof can be formed by machining, welding, casting, extrusion, pultrusion, molding, 3-D printing, additive manufacturing, the like, or combinations or multiples thereof.

In one example, the VAWT can include a drive shaft connected to the hub 102 and the gearbox 112. In another example, the rotor is connected directly to the generator 114 such as a permanent magnet generator.

The first and second support arms 106, 108 can be any appropriate length. In one example, the length of the second support arm 108 can be a ratio relative to the rotor diameter RD. The length of the second support arm 108 can be greater than or equal to ½ (one-half) of the rotor diameter RD, including, without limitation, lx the rotor diameter RD, 1.5× the rotor diameter RD, or the like. In another example, the length of the second support arm 108 can be a value. The length of the second support arm 108 can be, for example, less than or equal to 30 inches, or greater than 30 inches.

The first and second support arms 106, 108 can have any appropriate cross-sectional dimension.

The first and second support arms 106, 108 can have any appropriate cross-sectional shape, including, square, rectangle, circular, triangular, or the like.

Figure 4A:
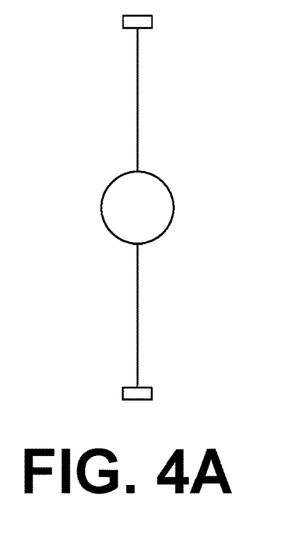
FIG. 4A illustrates a top down view of an example rotor.
Figure 4B:
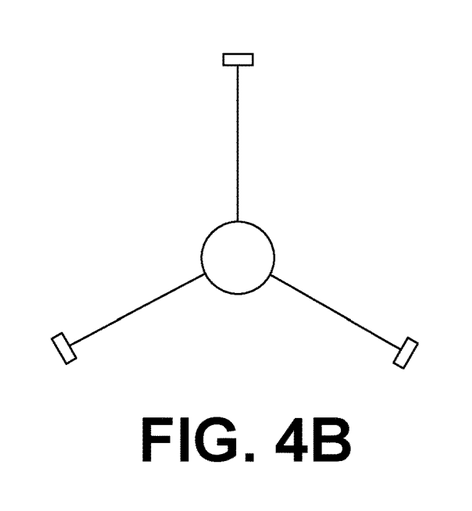
FIG. 4B illustrates a top down view of an example rotor.
Figure 4C:
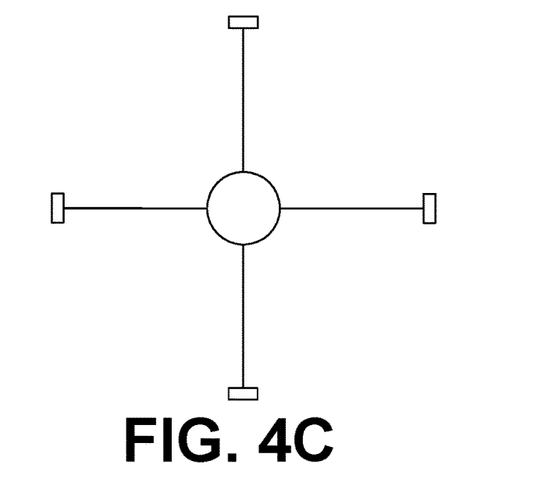
FIG. 4C illustrates a top down view of an example rotor.

The rotor can include any number of blades, including 1 blade, 2 blades (FIG. 4A), 3 blades (FIG. 4B), 4 blades (FIG. 4C), or more. Furthermore, though 2 support arms are discussed, the rotor can include at least one support arms, including 1, 2, 3, 4, 5, 6, 7, 8, 9, 10, or more support arms. In one example, the rotor can include more than 2 support arms. For example, a third support arm can be horizontal. As another example, a third support arm can have a downward or upward angle. In another example, the rotor can include 1 support arm.

Figure 2A:
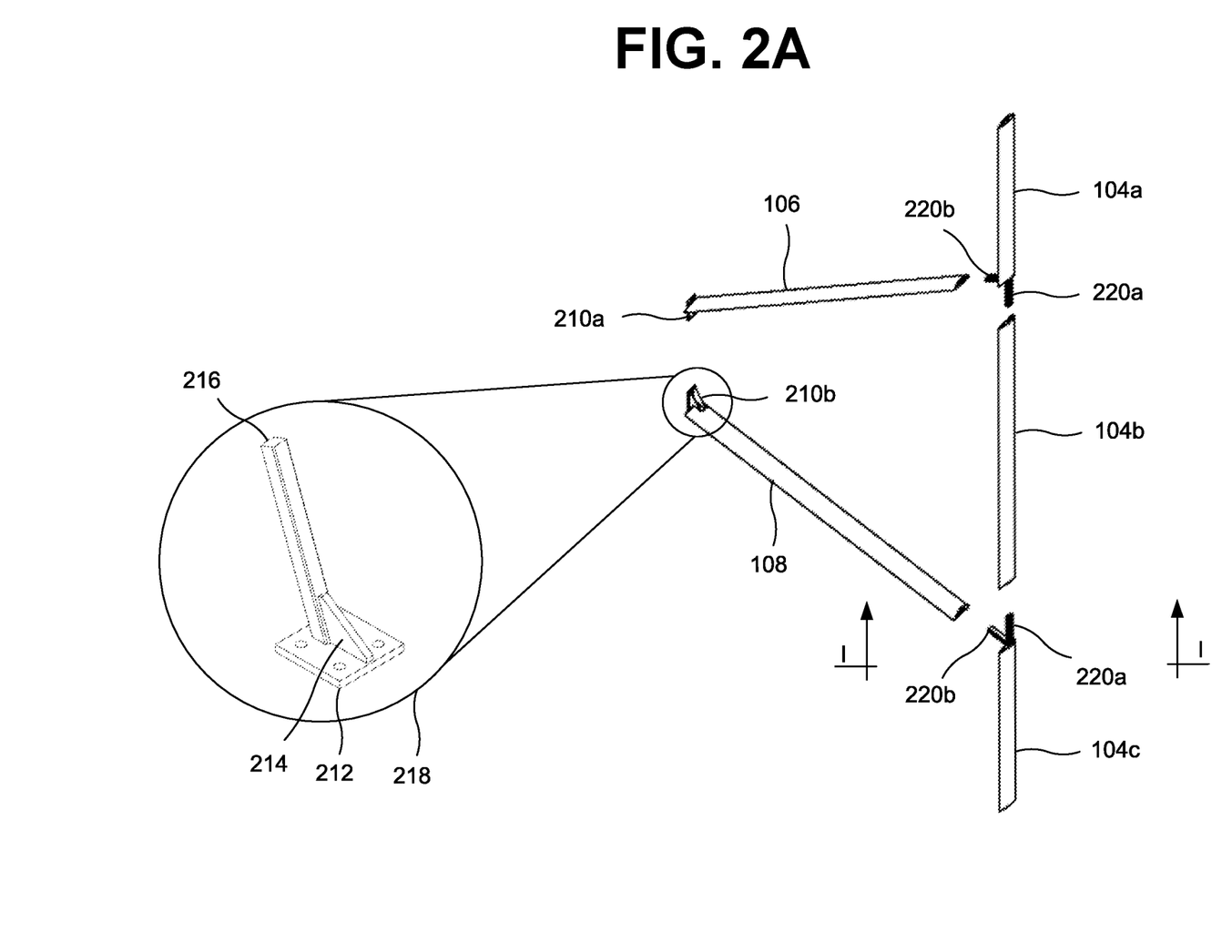
FIGS. 2A-2B illustrate an example blade and support arms system.
Figure 2B:
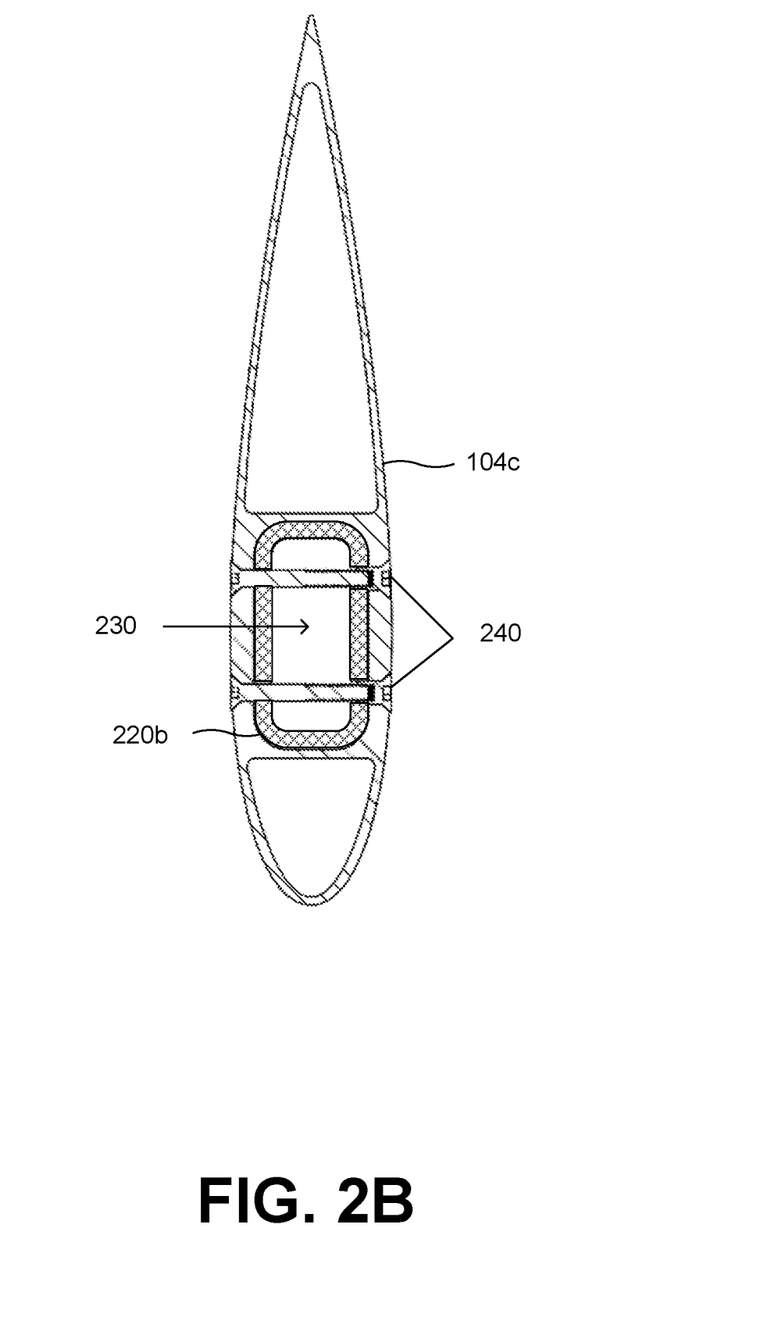

The blade 104 can be formed by any number of pieces, including up to 10, up to 20, up to 100, or the like. In one example, as shown in FIG. 2A, the blade 104 can be formed by 3 pieces, including a first piece 104a, a second piece 104b, and a third piece 104c. Each piece 104a-104c includes one or more cavities 230, as shown in FIG. 2B which is a cross-section of first piece 104a taken along the line I-I. The pieces 104a-104c can be connected to each other by one or more connectors 220. The first and second support arms 106, 108 can be connected to one of the pieces 104a-104c by one or more connectors. The connectors can be fixedly or removably attached to the support arms 106, 108 or the pieces 104a-104c via one or more couplings 240, which can be mechanical, chemical, or physical, such as an adhesive (e.g., glue, epoxy, or the like), a rivet, a through-bolt, a blind bolt, welding, the like, or combinations or multiples thereof. The one or more couplings 240 can transverse one or more walls of the support arms 106, 108 or the pieces 104a-104c or can be inserted into or through the one or more cavities of the support arms 106, 108 or the pieces 104a-104c.

Though FIG. 1 depicts the blades 104 as being straight and parallel relative to a central axis 120, the blades 104 are not intended to be so limited. The blades 104 can be helical, curved, tilted (i.e., not parallel to the central axis 120, or the like. The blades 104 can also be directly connected to the hub 102 at first and second ends of the blades 104, such as in a Darrieus rotor.

Figure 3A:
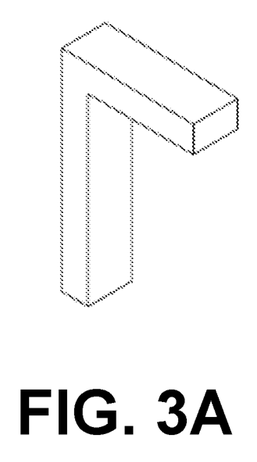
FIGS. 3A-3D illustrate example connectors.
Figure 3B:
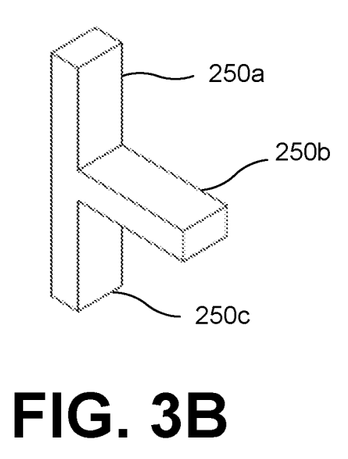
Figure 3C:
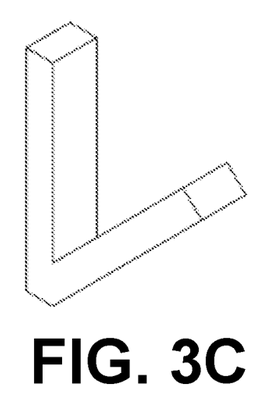
Figure 3D:
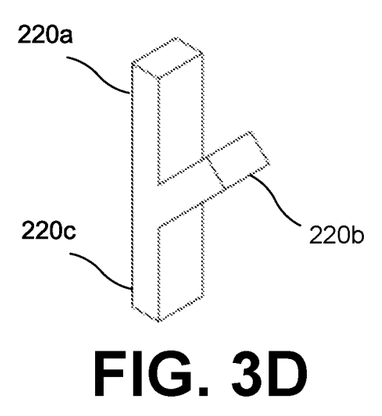

In one example, the connector can be Y-shaped, as shown in FIGS. 2A and 3D, having a first branch 220a, a second branch 220b, and a third branch 220c. The third branch 220c is inserted into the cavities 230 of the first piece 104a and the third piece 104c. The first branches 220a of each connector is inserted into a cavity of the second piece 104b. The second branch 220b of the connector extending from the first piece 104a is inserted into a cavity of the first support arm 106. The second branch 220b of the connector extending from the third piece 104c is inserted into a cavity of the second support arm 108. The connectors can be fixedly or removably attached to the support arms 106, 108 or the blade pieces 104a-104c via one or more couplings 240.

Figure 2C:
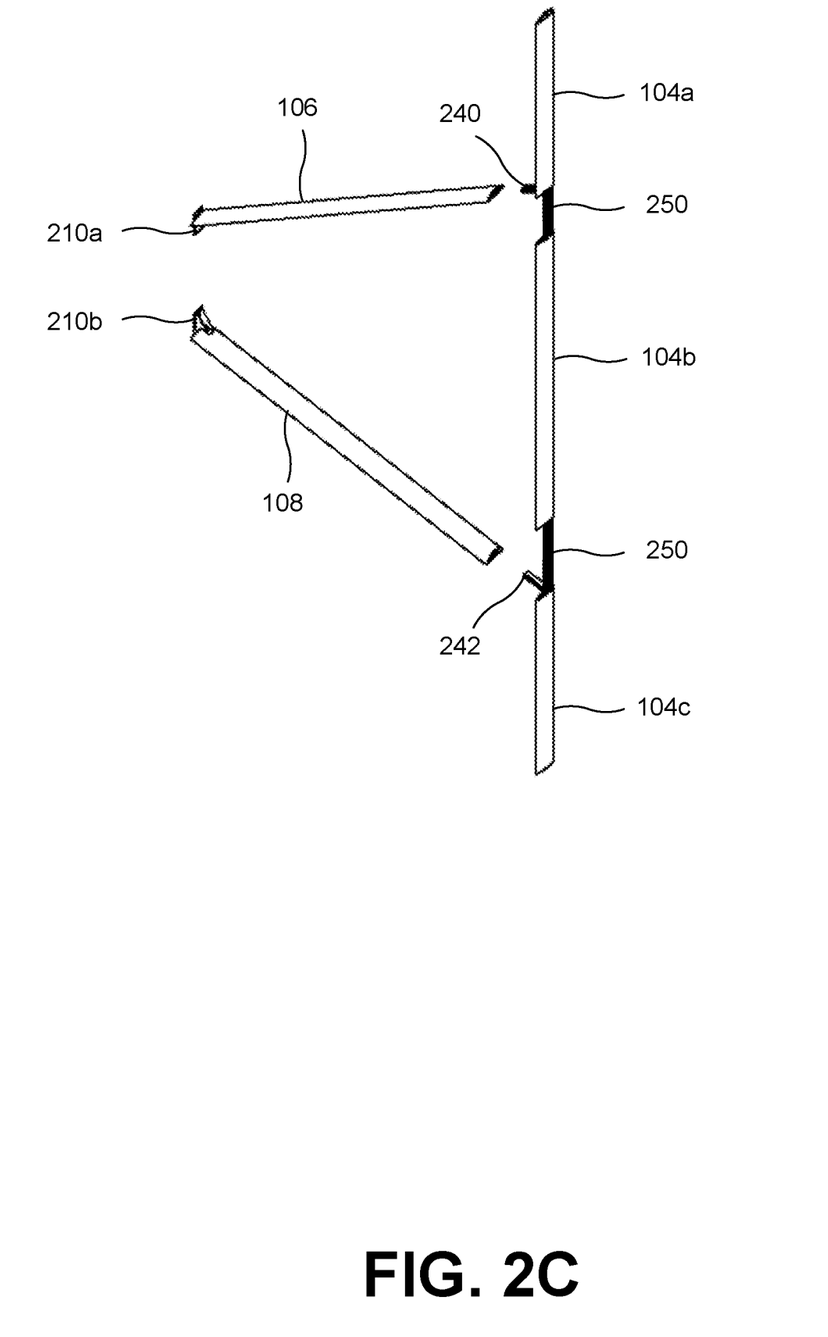
FIG. 2C illustrates an example blade and support arms system.

In another example, as shown in FIG. 2C, a blade connector 250 can extend from the first piece 104a through the second piece 104b and into the third piece 104c. The first and second support arms 106, 108 can each be connected to the first piece 104a and third piece 104c, respectively, with support arm connectors 240, 242 adjoining the first support arm 106 with the first piece 104a and the second support arm 108 with the third piece 104c. However, the first and second support arms 106, 108 need not only be connected to the first and second pieces 104a, 104c, respectively. The first support arm 106 or the second support arm can be connected to the second piece 104b. The support arm connectors 240, 242 can be any appropriate shape, including V-shaped (FIG. 3C), L-shaped (FIG. 3A), I-shaped (straight and unbranched), or the like. The connectors can be fixedly or removably attached to the support arms 106, 108 or the pieces 104a-104c via one or more couplings.

Figure 2D:
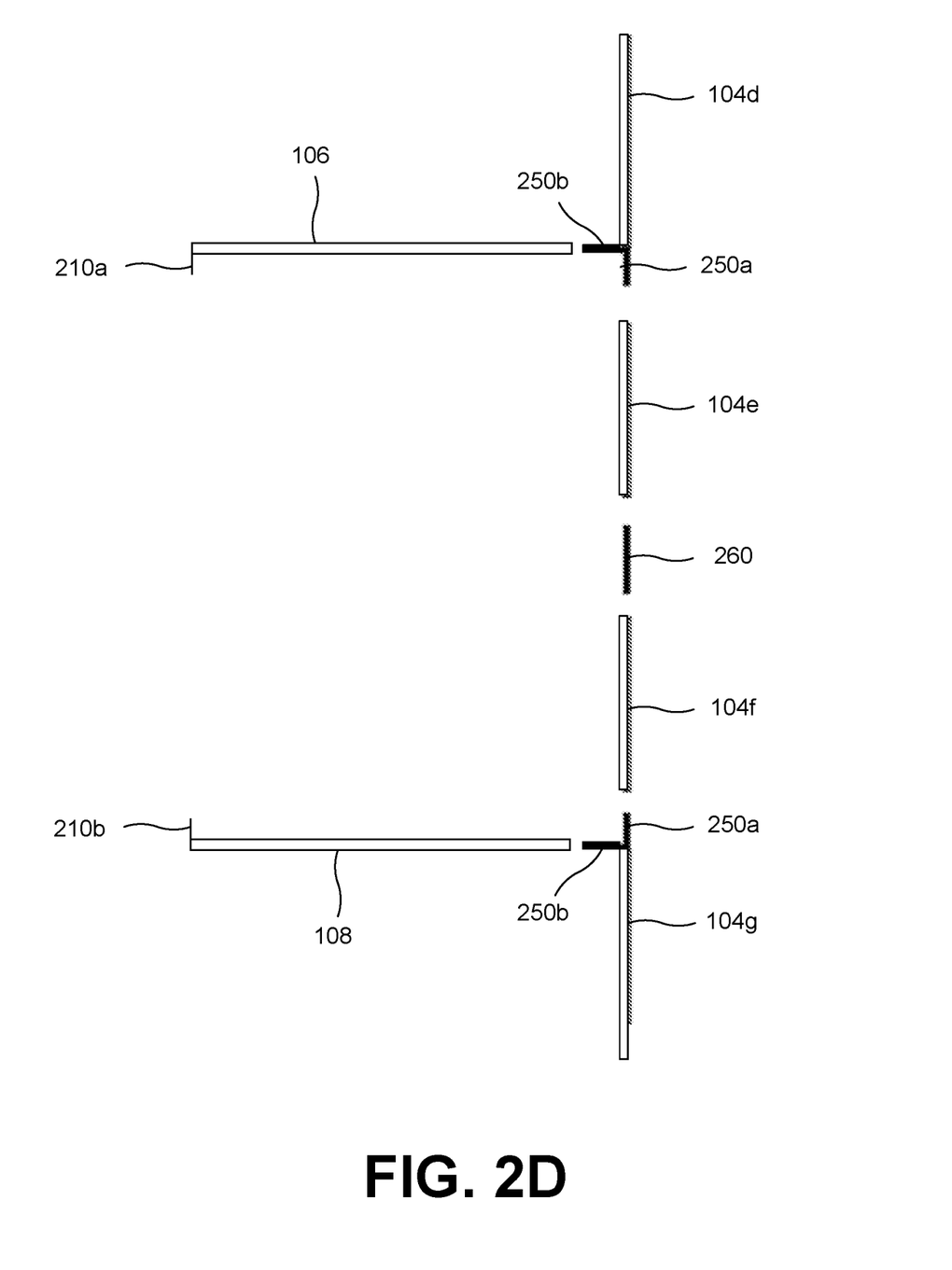
FIG. 2D illustrates an example blade and support arms system.

In another example, as shown in FIGS. 2D and 3B, the connector be T-shaped. FIG. 2D also shows the blade 104 broken into 4 pieces 104d-104g. The connector includes a first branch 250a, a second branch 250b, and a third branch 250c. The third branch 250c is inserted into the cavities of a first piece 104d and a fourth piece 104g. The second branch 250b of the connector extending from the first piece 104d is inserted into a cavity of the first support arm 106. The second branch 250b of the connector extending from the fourth piece 104g is inserted into a cavity of the second support arm 108. The first branch 250a of the connector extending from the first piece 104d is inserted into a cavity of a second piece 104e. The first branch 250a of the connector extending from the fourth piece 104g is inserted into a cavity of a third piece 104f. The second third pieces 104e, 104f can be connected with a blade connector 260 having a "1" shape. The connectors can be fixedly or removably attached to the support arms 106, 108 or the pieces 104d-104g via one or more couplings.

The rotor can include brackets 210a, 210b to attach the first and second support arms 106, 108, respectively to the hub 102. In one example, the brackets 210a, 210b can be a component of the first and second support arms 106, 108, respectively (i.e., the first and second support arms 106, 108 can be manufactured with the brackets 210a, 210b). In another example, the brackets 210a, 210b can be adjoined to the first and second support arms 106, 108, respectively, such as with one or more couplings, which can be mechanical, chemical, or physical, such as an adhesive (e.g., glue, epoxy, or the like), a rivet, a through-bolt, welding, the like, or combinations or multiples thereof. In another example, the brackets 210a, 210b can be adjoined to the hub 102, such as with one or more couplings, which can be mechanical, chemical, or physical, such as an adhesive (e.g., glue, epoxy, or the like), a rivet, a through-bolt, welding, the like, or combinations or multiples thereof.

Magnified view 218 shows the brackets 210a, 210b. The brackets 210a, 210b each include a base 212 to adjoin or connect the respective support arms 106, 108 to the hub 102. The brackets 210a, 210b each also include a post 216 to be inserted into the respective support arms 106, 108. The brackets 210a, 210b can each also include a brace 214 to support or resist forces exerted on the brackets 210a, 210b or the respective support arms 106, 108.

Though the connectors are discussed as being internal to the blade and support arms of the rotor, the connectors need not be so limited. The connectors can be external to the blade and support arms. The external connectors can be rods, braces, splints, or the like and adjoined to support arms, blade, or both via couplings. The external connectors can also fit around the connector, such as a screw clamp, a hollow tube, or the like.

The connectors can be used to removably attach or separably connect the blades and support arms, the blades and the hub, and the support arms and the hub Though the first and second support arms 106, 108 are each discussed as being single pieces, the first support arm 106, the second support arm 108, or both can be formed by any number of pieces, including up to 10, up to 20, up to 100, or the like. Pieces of the first and second arm support 106, 108 can be adjoined via a connector (e.g., a sleeve connector or a connector insertable into a cavity). The first and support arms 106, 108 can be connected to the blades 104 or the hub 102 by a connector (i.e., sleeve connector or connector insertable into a cavity). The hub 102 can include a branch to be inserted into a sleeve connector.

Figure 5:
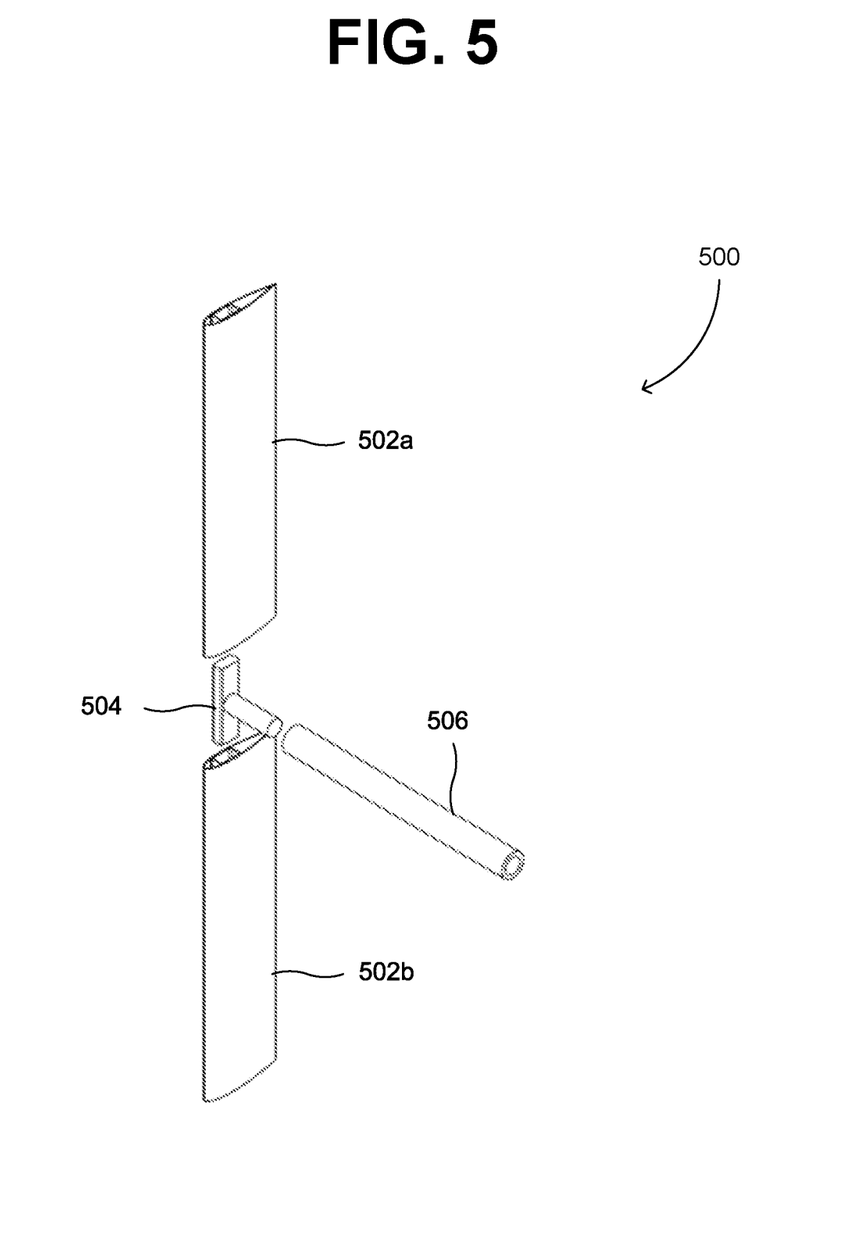
FIG. 5 illustrates an example rotor segment.

FIG. 5 shows a rotor segment 500 which is similar to the rotor segment of fluid turbine 100, except that the rotor segment 500 includes a support arm 506 to adjoin or connect a blade including a first blade piece 502a and a second blade piece 502b to the hub (not shown). The first and second blade pieces 502a, 502b can be adjoined to connected to each other (e.g., separably connect) to form the blade with a connector 504. In this example, the connector 504 is T-shaped. Though the connector 504 can be any appropriate shape, as discussed above. The support arm 506 can adjoin or connect to a branch of the connector 504 to adjoin or connect (e.g., removably attach) the blade to the hub (not shown).

Figure 6:
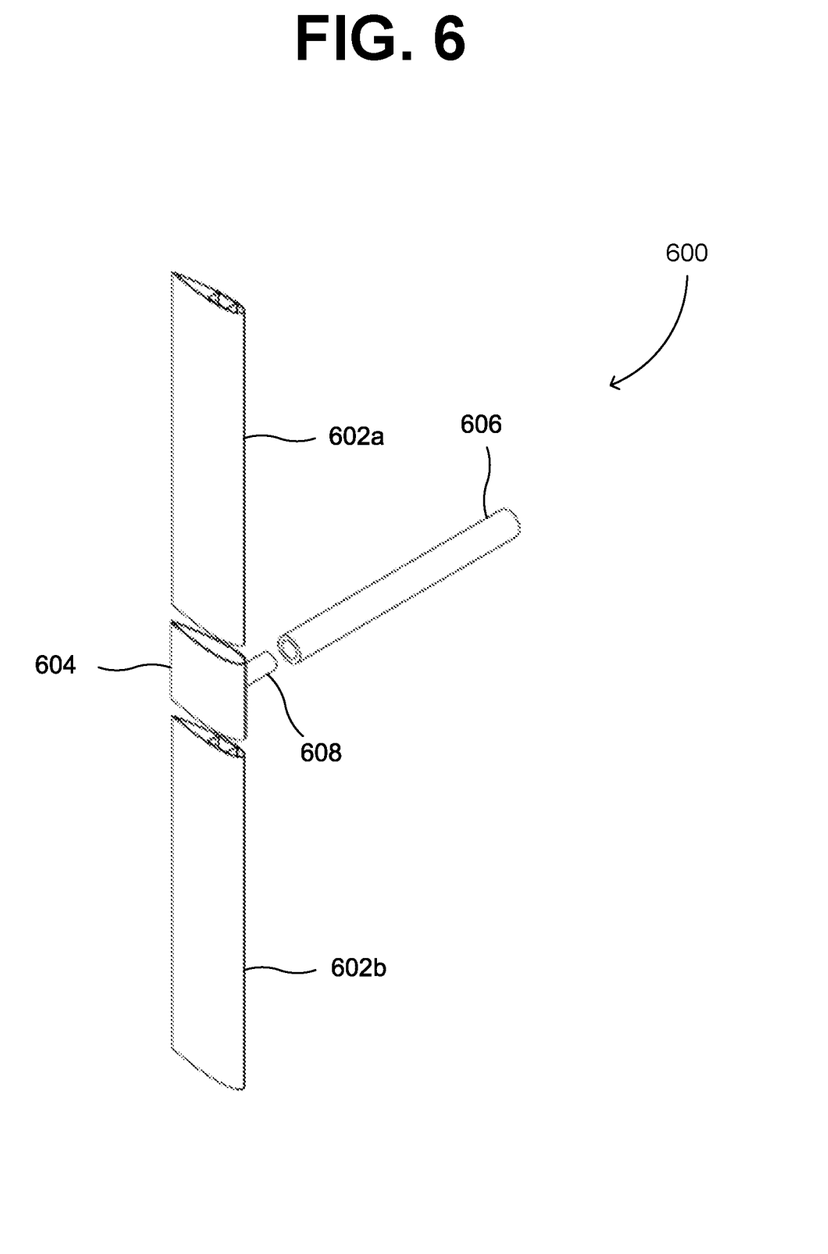
FIG. 6 illustrates an example rotor segment.

FIG. 6 shows a rotor segment 600 which is similar to the rotor segment 500, except that the rotor segment 600 includes a sleeve connector 604 to adjoin first and second blade pieces 602a, 602b to form a blade. The sleeve connector 604 includes a main body having a first opening at a first side, a second opening at a second side, and a hole extending from the first opening to the second opening. The first blade piece 602a extends into the hole via the first opening and the second blade piece 602b extends into the hole via the second opening. The sleeve connector 604 also includes a branch 608 extending from the main body in a direction that is not parallel to the hole. A support arm 606 mates with the branch 608 to removably attach the blade to the hub (not shown).

Alternatively, the sleeve connector 604 does not include a hole extending the full length of the main body. For example, the main body includes a first opening at a first side and a second opening at a second side. The first blade piece 602a extends into the first opening and the second blade piece 602b extends into the second opening. The first and second blade pieces 602a, 602b can be separated within the sleeve connector 604 via an intermediary separator.

The rotor segment 600 also includes the support arm 606 to adjoin or connect (e.g., removably attach) the blade including the first blade piece 602a and the second blade piece 602b to the hub (not shown).

Though certain elements, aspects, components or the like are described in relation to one embodiment or example of a fluid turbine, those elements, aspects, components or the like can be including with any other fluid turbine, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents:

What is claimed is:

1. A fluid turbine comprising
a hub; and
a rotor segment configured to couple to the hub, the rotor segment comprising:
a first piece having a first main body and a first cavity extending into the first main body;
a second piece having a second main body and a second cavity extending into the second main body, wherein the first piece includes at least a segment of blade and the second piece includes a support arm; and
a connector configured to separably adjoin the first and second pieces at a non-orthogonal angle, the connector including a first portion at least partially located within the first cavity of the first piece and a second portion at least partially located within the second cavity of the of the second piece.

2. The fluid turbine of claim 1, wherein the connector includes at least two branches.

3. The fluid turbine of claim 2, wherein the first portion of the connector is part of a first branch of the at least two branches and the second portion of the connector is part of a second branch of the at least two branches.

4. The fluid turbine of claim 3, wherein the first piece is a blade and the second piece is a support arm.

5. The fluid turbine of claim 3, wherein the rotor segment further comprises a third piece having a third main body and a third cavity extending into the third main body.

6. The fluid turbine of claim 5, wherein the connector includes a first branch, a second branch, and a third branch, wherein the first portion of the connector is part of a first branch and the second portion of the connector is part of a second branch of the at least two branches, wherein the connector further includes a third portion as part of the third branch that extends into the third cavity of the third piece.

7. The fluid turbine of claim 6, wherein the first piece is a first segment of the blade and the third piece is a second segment of the blade.

8. The fluid turbine of claim 6, wherein the connector is Y-shaped.

9. The fluid turbine of claim 1, wherein at least one of the first and second pieces each have a cross section in the shape of an airfoil.

10. The fluid turbine of claim 1, wherein each of the first and second pieces includes a first end and a second end.

11. The fluid turbine of claim 10, wherein the cavity of the first piece is located at the first or second end of the first piece, and wherein the cavity of the second piece is located at the first or second end of the second piece.

12. The fluid turbine of claim 1, further comprising a plurality of additional rotor segments configured to couple to the hub.

\* \* \* \* \*